US006311494B2

(12) United States Patent
McKinley et al.

(10) Patent No.: US 6,311,494 B2
(45) Date of Patent: Nov. 6, 2001

(54) EXHAUST GAS RECIRCULATION SYSTEM FOR A TURBOCHARGED INTERNAL COMBUSTION ENGINE

(75) Inventors: Thomas L. McKinley; Philip M. Dimpelfeld; John M. Mulloy, all of Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/774,866

(22) Filed: Jan. 31, 2001

Related U.S. Application Data

(63) Continuation-in-part of application No. 09/378,647, filed on Aug. 20, 1999.

(51) Int. Cl.$^7$ .................................................. F02B 33/44
(52) U.S. Cl. ............................................ 60/605.2; 60/602
(58) Field of Search ................................. 60/605.2, 602; 123/568.18

(56) References Cited

U.S. PATENT DOCUMENTS

| 4,215,550 | 8/1980 | Dinger et al. ......................... 60/606 |
| 4,373,498 | 2/1983 | Ushimura . |
| 4,496,291 | 1/1985 | Grimmer . |
| 4,615,172 | * 10/1986 | Mayer ..................................... 60/602 |
| 4,756,285 | 7/1988 | Pischinger . |
| 5,564,275 | 10/1996 | Codan et al. ........................ 60/605.2 |
| 5,657,630 | 8/1997 | Kjemtrup et al. ................... 60/605.2 |
| 5,738,126 | * 4/1998 | Fausten ................................ 123/569 |
| 5,791,146 | 8/1998 | Dungner .............................. 60/605.2 |
| 5,794,445 | 8/1998 | Dungner .............................. 60/605.2 |
| 5,806,308 | 9/1998 | Khair et al. ............................. 60/278 |
| 5,813,231 | 9/1998 | Faletti et al. ............................ 60/602 |
| 5,927,075 | 7/1999 | Khair .................................. 60/605.2 |
| 5,937,650 | 8/1999 | Arnold ................................ 60/605.2 |
| 5,937,651 | 8/1999 | Braun et al. ........................ 60/605.2 |
| 6,003,316 | 12/1999 | Baert et al. ........................ 60/605.2 |
| 6,035,639 | 3/2000 | Kolmanovsky et al. ........... 60/605.2 |
| 6,062,027 | * 5/2000 | Landfahrer et al. ................ 60/605.2 |
| 6,230,682 | * 5/2001 | Gustafsson et al. ................ 60/605.2 |
| 6,244,256 | * 6/2001 | Wall et al. .......................... 60/605.2 |

FOREIGN PATENT DOCUMENTS

| 4231218 | 9/1993 | (DE) . |
| 43 12462 | 10/1994 | (DE) . |
| 0 531 277 A2 | 8/1992 | (EP) . |
| 5-71426 | 3/1993 | (JP) . |
| 1091325 | 4/1995 | (JP) . |
| WO 94/29587 | 12/1994 | (WO) . |
| WO 96/18030 | 6/1996 | (WO) . |

* cited by examiner

*Primary Examiner*—Thomas Denion
*Assistant Examiner*—Thai Ba Trieu
(74) *Attorney, Agent, or Firm*—Leydig, Voit & Mayer, Ltd.

(57) ABSTRACT

An exhaust gas recirculation (EGR) enhancement system for a turbocharged internal combustion engine includes a throttle valve arranged in the exhaust duct of the engine, downstream of the EGR system. The throttle valve is controlled in response to engine load and engine speed to selectively provide back pressure upstream of the throttle valve to selectively drive an EGR exhaust flow through an EGR duct to the intake manifold. An embodiment of the EGR system includes a cooler that lowers the temperature of the EGR exhaust flow to provide better reductions in nitric oxide emissions. The turbine is equipped to allow excess pressure to be released through a wastegate duct arranged in fluid parallel with the exhaust turbine, thereby allowing for higher power and higher speeds.

30 Claims, 5 Drawing Sheets

EXHAUST GAS RECIRCULATION SYSTEM FOR A TURBOCHARGED INTERNAL COMBUSTION ENGINE

CROSS-REFERENCE TO RELATED APPLICATION

This is a continuation in part of U.S. patent application Ser. No. 09/378,647, filed on Aug. 20, 1999.

FIELD OF THE INVENTION

The present invention generally relates to turbocharged internal combustion engines and more particularly relates to exhaust gas recirculation systems for turbocharged internal combustion engines having a wastegate.

BACKGROUND OF THE INVENTION

In internal combustion engines, a process known as exhaust gas recirculation (EGR) is used to reduce the amount of nitric oxide ($NO_x$) emissions. In general, EGR involves routing a portion of the exhaust gas back into the intake air flow. In an engine where exhaust back pressure is greater than intake air pressure (e.g., most normally aspirated engines) an EGR flow can be realized simply by connecting a conduit between the exhaust and intake ducts. The flow from the exhaust manifold is drawn to the lower pressure of the intake because of the negative pressure differential. However, in a turbocharged internal combustion engine having a charged intake, an unfavorable pressure differential must be overcome.

More particularly, in turbocharged diesel engines, the recirculated exhaust gas flow is typically introduced into the intake air downstream of the turbocompressor and intercooler components in order to avoid degradation of these components. Unfortunately, the intake air is pressurized at this location, presenting an unfavorable intake to exhaust pressure ratio for transporting EGR gases. Diesel engines with efficient, well-matched turbochargers have an insufficient exhaust-to-intake pressure differential during some operating states to induce an amount of EGR flow sufficient to reduce nitric oxide emissions in compliance with environmental emissions regulations. For example, when an engine is running at a low speed under a high load, the exhaust temperature can be hot enough that the intake manifold pressure is higher than the exhaust manifold pressure. If a connection is opened between the intake manifold and the exhaust manifold through the EGR system, air flows from the intake manifold into the exhaust manifold, rather than the desired flow from the exhaust manifold to the intake manifold.

Various EGR systems are known which attempt to overcome this unfavorable pressure differential via a supplemental pump or compressor operable to force flow through the EGR duct from the exhaust manifold to the intake manifold. Such EGR compressors can be mechanically driven, electric, or exhaust-driven by a second turbocompressor. It is also known to provide a supplemental compressor in the EGR system to drive flow. However, they require a relatively large amount of energy which tends to substantially sacrifice fuel economy. These systems also increase the complexity and cost of assembling an engine.

Systems are also known which attempt to achieve exhaust-to-intake EGR flow by increasing the pressure in the exhaust manifold (backpressure). This can be achieved with careful engine design choices, such as the selection of a turbocharger having a particular fixed-geometry turbine size to yield an appropriate pressure differential. To increase EGR flow in a particular engine, a fixed-geometry turbocharger could be selected to have a relatively small size, having a correspondingly small swallowing capacity and a high flow restriction. The high flow restriction would provide increased backpressure upstream of the turbine sufficient to drive the EGR flow back to the intake manifold. Unfortunately, a turbocharger turbine and compressor selected to provide such backpressure are poorly matched, and such a system results in less-than-optimal performance, sacrificing fuel economy and power, especially at higher engine speeds.

In conjunction with the relatively small sized turbine discussed in the aforementioned paragraph, it is further known to provide a wastegate for bypassing excess amounts of exhaust backpressure in an attempt to thereby increase engine power at relatively high speeds. The wastegate bypass typically includes a modulating valve which modulates exhaust flow therethrough at a frequency synchronous with exhaust pulses. Although engine efficiency and power are improved overall, this solution still results in a smaller turbine being selected for the engine than is desired for optimal performance and fuel economy. Furthermore, the modulating valve of the wastegate bypass has been known to experience reliability problems due to the harsh engine environment in which it operates. In particular, the modulating valve of the wastegate bypass typically operates in close proximity to the engine's combustion chambers where exhaust temperatures, gas pressures and engine vibrations are greater. These factors decrease control over the wastegate valve which in turn decreases control over EGR flow and the engine in general.

In an attempt to overcome the problems of wastegated turbines having a small, fixed swallowing capacity, it is known to provide a variable geometry turbine with movable vanes that can be adjusted to vary the swallowing capacity and flow resistance of the turbine. However, this solution is only viable in situations where cost is not prohibitive, because variable geometry turbines are typically more expensive than wastegated turbines. Moreover, in these systems the boost and rotor speed provided by the turbine become dependent upon swallowing capacity of the turbine which results in less than desirable engine performance at various engine operating conditions.

Given that emissions regulations are increasingly becoming more stringent, an improved EGR system is needed.

SUMMARY OF THE INVENTION

An object of the present invention is to provide an improved exhaust gas recirculation (EGR) system for an internal combustion engine. Another object of the present invention is to provide an effective EGR system which is reasonably inexpensive. The present invention achieves these objects and overcomes deficiencies in the prior art by providing, in an embodiment, an EGR system that utilizes a valve located downstream of an exhaust turbine. In an embodiment, the EGR system has a controller for controlling the valve to optimize engine performance and emissions depending upon the operating conditions.

The present invention is generally directed to an EGR system for a turbocharged internal combustion engine. The engine includes a turbocharger having a compressor for compressing air delivered to an intake manifold and an exhaust turbine arranged in an exhaust duct for driving the compressor. The EGR system includes an EGR duct extending between the intake duct and exhaust duct to permit fluid communication therebetween. The EGR duct generally guides an EGR flow of exhaust gas from the exhaust duct to the intake duct to achieve a reduction in nitric oxide emissions from the engine. A throttle valve is arranged in the exhaust duct downstream of an inlet port which opens to the EGR duct. The throttle valve is controlled by a controller for selectively restricting the flow through the exhaust duct, and thereby varying backpressure upstream of the throttle valve, to adjust an amount of EGR flow through the EGR duct.

According to an embodiment of the present invention, a wastegate valve is arranged in parallel with the exhaust turbine and upstream of the throttle valve to bypass a portion of the exhaust gas flow around the turbine. According to this embodiment, the exhaust turbine may be of the fixed geometry type with a fixed swallowing capacity.

According to another embodiment, the exhaust turbine is of the variable geometry type. The variable geometry turbine includes variable geometry vanes controlling the swallowing capacity of the turbine and the turbine efficiency. An actuator, which is controlled by the controller, selectively adjusts the position of the variable geometry vanes to control the swallowing capacity of the turbine.

In an embodiment, the controller can at least partially close the throttle valve during starting conditions. This results in creating higher backpressure and the burning of fuel at a higher rate to achieve idle conditions. This results in a higher rate of heat transfer into the engine components. In such a manner, the EGR system of the invention can advantageously decrease the time needed to warm the engine.

In an embodiment, the controller can at least partially close the throttle valve during higher speed operation. This builds backpressure to provide compression resistance in the cylinders. Advantageously, the EGR system of the invention can be controlled in such a manner to provide a compression braking.

It is therefore an advantage of the present invention to provide an improved way to selectively increase or control the EGR flow in a turbocharged internal combustion engine.

For turbocharged internal combustion engines that include a variable geometry turbine, it is a further advantage of the present invention to decouple the swallowing capacity of the turbine from the boost and rotor speed of the turbine.

For turbocharged internal combustion engines that include a wastegated turbine, another advantage of the present invention is to provide a turbine that has an increased swallowing capacity to provide for increased engine efficiency and power while maintaining the desired EGR flow under certain engine conditions.

A further advantage of the present invention is to provide an enhanced EGR system which has few parts and a reasonable cost.

These and other features and advantages of the invention are disclosed in, and will become apparent from, the detailed description of the presently preferred embodiments and from the drawings.

BRIEF DESCRIPTION OF THE DRAWINGS

FIG. 2 illustrates a system having a throttle valve downstream of the turbine and downstream of a port from in which the wastegate flow exits the wastegate duct into the exhaust.

FIG. 3 illustrates a system having a throttle valve downstream of the turbine for selective control of flow from turbine, but upstream of a port from in which the wastegate flow exits wastegate duct.

FIG. 4 illustrates a system having a throttle valve upstream of the turbine and upstream of an inlet port into which the wastegate flow enters the wastegate duct.

FIG. 5 illustrates a system having a throttle valve upstream of the turbine and downstream of an inlet port into which the wastegate flow enters the wastegate duct.

DETAILED DESCRIPTION OF THE PREFERRED EMBODIMENT

Figure 1:
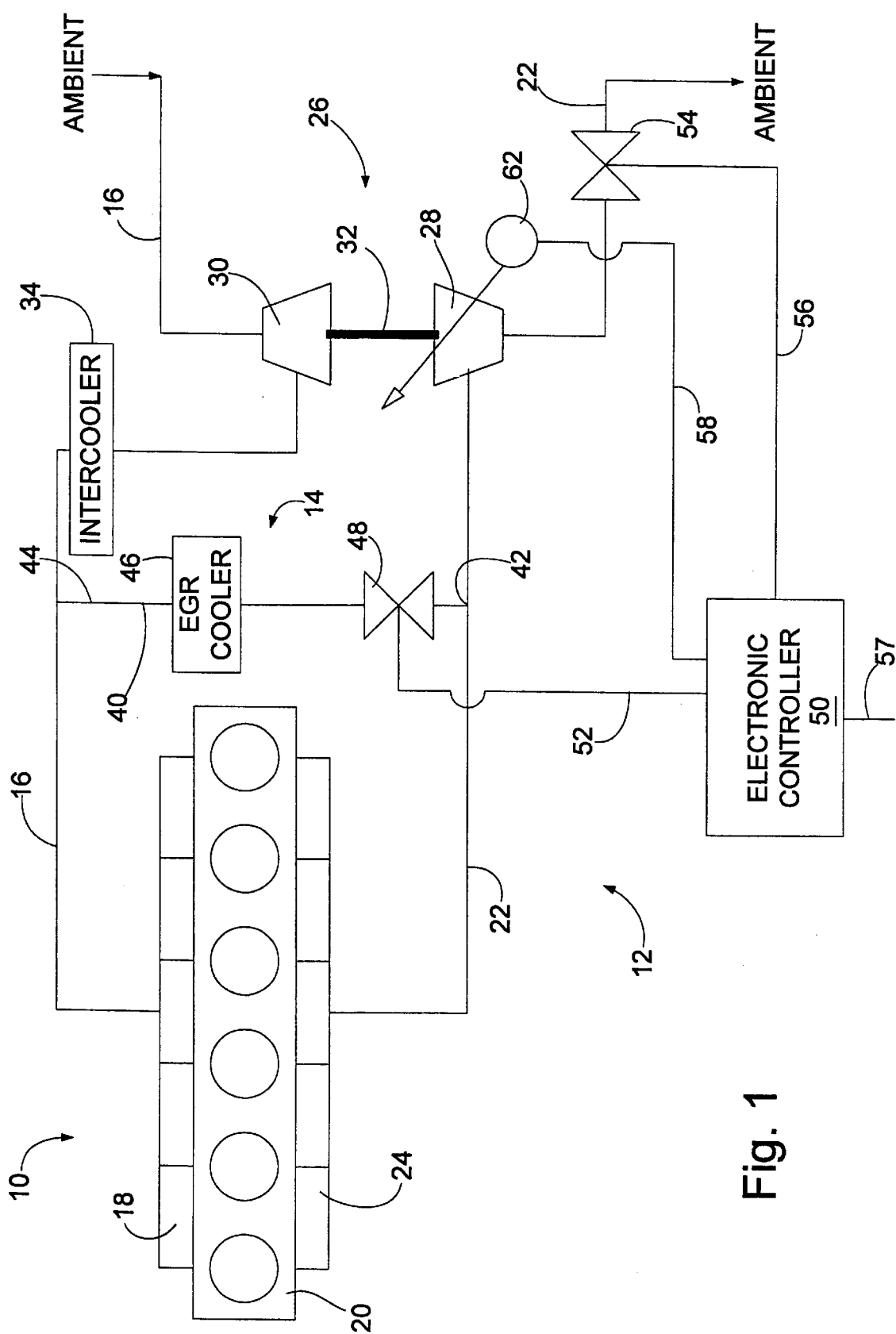
FIG. 1 is a schematic illustration of an exhaust gas recirculation system for an internal combustion engine in accordance with a first embodiment of the present invention.

Now referring to the drawings, wherein like numerals designate like parts, FIGS. 1–5 schematically illustrate respective embodiments of an internal combustion engine 10 equipped with an EGR system 12, 14, providing exhaust gas recirculation. In each of these embodiments, the engine 10 includes an intake duct 16 having an intake manifold 18 delivering a flow of intake air to the engine cylinders 20 and an exhaust duct 22 having an exhaust manifold 24 carrying a flow of exhaust gas away from the cylinders 20 and ultimately to discharge into the ambient air, as indicated. In general, the EGR system 14 carries an EGR flow from the exhaust duct 22 back to the intake duct 16.

The engine 10 includes a turbocharger 26, 26', as illustrated in FIGS. 1 and 2–5, respectively, for compressing the intake air in a conventional manner. The turbocharger 26, 26' includes an exhaust turbine 28, 28', respectively, arranged in the exhaust duct 22 that is driven by the exhaust flow therethrough. The exhaust turbine 28, 28' is drivingly connected to an intake compressor 30 via a common shaft 32 or other connection. The intake compressor 30 is arranged in the intake duct 16 to compress the intake air. A heat exchanger or intercooler 34 may also be arranged in the intake duct 16 downstream of the intake compressor 30 for cooling and increasing the density of the compressed intake air.

To facilitate the EGR flow, the EGR system 12, 14 includes an EGR duct 40 having an inlet port 42 connected to the exhaust duct 22 upstream of the exhaust turbine 28, 28' and an outlet port 44 connected to the intake duct 16, preferably downstream of the intake compressor 30 and intercooler 34. As the exhaust gas flows through the EGR duct 40, it preferably passes through an EGR cooler 46 to lower its temperature to around 250 to 300 degrees F, to thereby increase the density of the exhaust gases in the EGR flow to effect a more efficient reduction in nitric oxide emissions.

To selectively permit or restrict EGR flow, an embodiment of the EGR system 12, 14 includes an EGR valve 48 arranged in the EGR duct 40, preferably upstream of the EGR cooler 46. The EGR valve 48 may be a shutoff type valve which is selectively positioned in an open or closed position to selectively allow or shut off EGR flow. Alternatively, the EGR valve 48 can be operable in a modulating manner to selectively allow or restrict EGR flow. Under certain operating conditions where EGR flow is unnecessary or could potentially create adverse effects to the engine, a controller 50 delivers a signal via line 52 which actuates the EGR valve 48 to restrict or turn off the EGR flow. For example, the EGR valve 48 may be actuated to close during high transient torque demand situations, thereby shutting off flow through the EGR duct 40.

For selectively controlling exhaust backpressure and thereby controlling the EGR flow, the EGR system 12, 14 includes a throttle valve 54, as illustrated in each of FIGS. 1–5. In accordance with an embodiment of the present invention, the throttle valve 54 is located in the exhaust duct 22 downstream of the EGR inlet port 42. In general, the throttle valve 54 is operable to selectively restrict exhaust flow through the exhaust duct 22, thereby increasing backpressure upstream of the throttle valve 54 and, in turn, increasing the pressure differential across between the exhaust duct 22 and intake duct 16 across the EGR duct 40. By using the throttle valve 54 to control backpressure in this manner, the EGR flow can be controlled.

Figure 2:
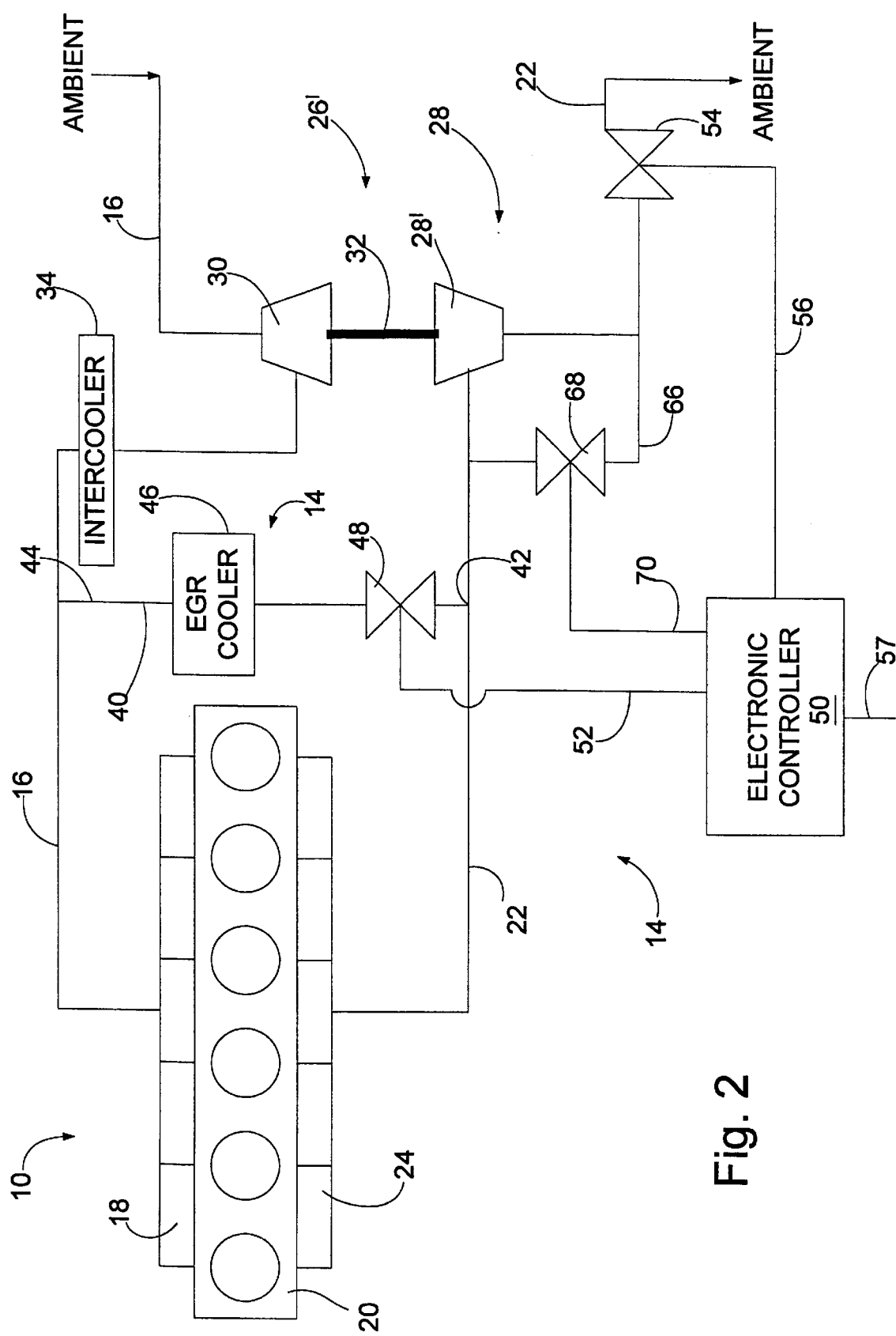
FIGS. 2–5 are schematic illustrations of exhaust gas recirculation systems of respective embodiments of the invention, each including a wastegate bypass duct capable of selectably directing a portion of exhaust flow around the exhaust turbine. More particularly.
Figure 3:
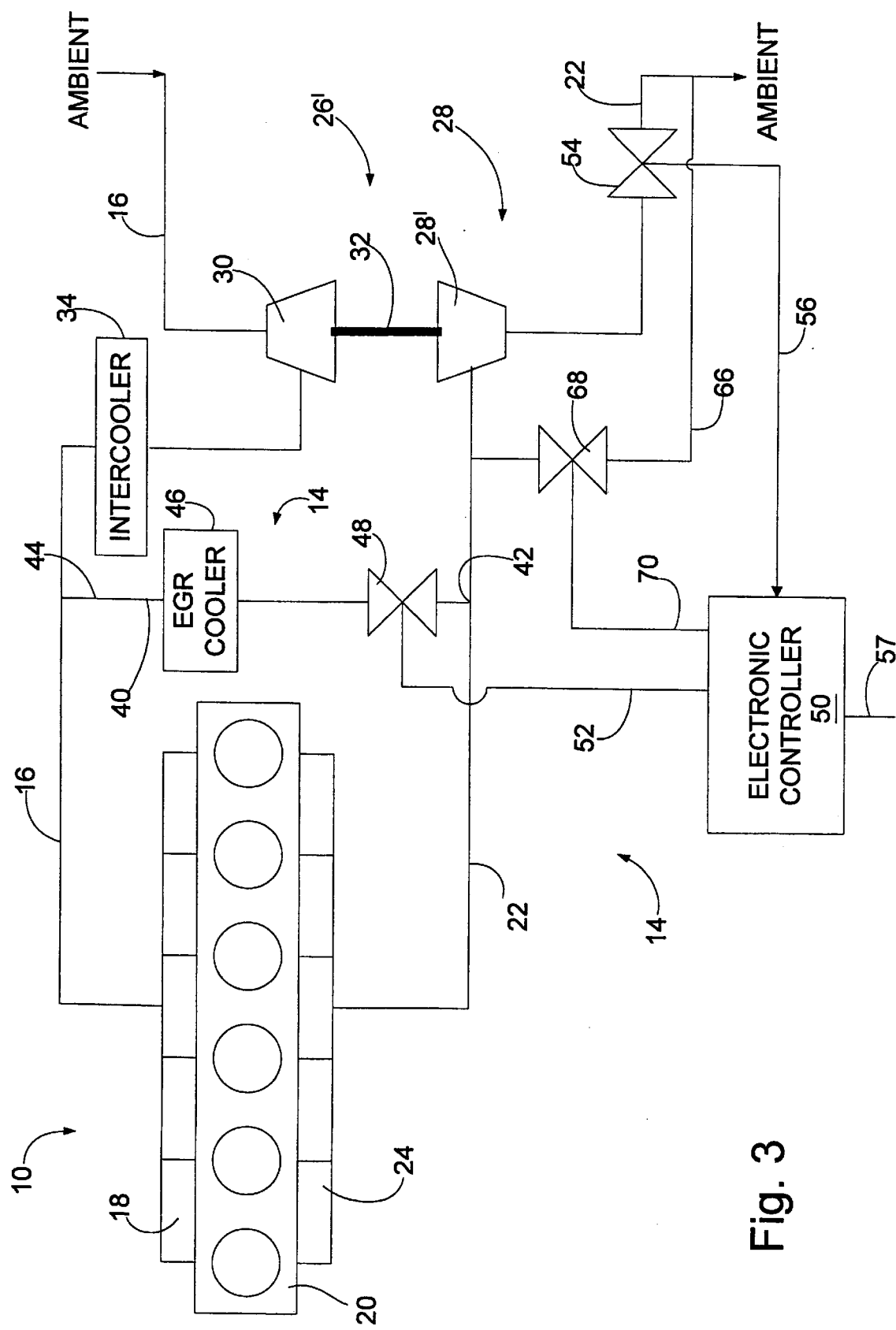

In a preferred embodiment, as illustrated in FIGS. 1–3, the throttle valve 54 is located downstream of the exhaust turbine 28, 28' where the valve 54 is subjected to less severe engine vibrations, gas pressures and thermal loads. This advantageously allows the use of a less expensive throttle valve 54 with lower tolerance requirements than required for an embodiment wherein the throttle valve 54 is located upstream of the turbine 28. Locating the throttle valve 54 downstream of the exhaust turbine 28, 28' also generally increases the life span of the throttle valve 54 and therefore the reliability of the engine 10, 12. However, in another embodiment of the invention, the throttle valve 54 can be located upstream of the turbine 28, 28'.

To increase the EGR flow, the controller 50 sends a signal via line 56 to the throttle valve 54 to selectively control the degree of opening of the throttle valve 54 which thereby provides a selected flow restriction in the exhaust duct 22 downstream of the EGR inlet port 42. The restriction provided by the throttle valve 54 increases the back pressure in the exhaust duct 22 upstream of the throttle valve 54 which increases the portion of the exhaust flow introduced into the EGR duct 40, thereby increasing the EGR flow. The greater EGR flow achieves a more environmentally friendly engine by effecting increased overall reductions in nitric oxide emissions. To decrease EGR flow, the controller 50 sends another signal via line 56 to the throttle valve 54 to provide a less restrictive restriction and thereby decrease the back pressure in the exhaust duct 22 and the amount of EGR flow. Decreasing EGR flow typically improves engine power, efficiency and performance.

In an embodiment, the controller 50 is capable of positioning the throttle valve 54 in an open position, a closed position, and variable positions therebetween. The controller 50 selectively positions the throttle valve 54 in response to one or more sensed parameters, such as engine load, engine speed, EGR flow rate or another parameter as delivered by a signal to the controller 50 via one or more input line 57. For example, at lower speeds, such as at low speed and high or partial loads, the controller may partially close the throttle valve 54 to provide a relatively high restriction to increase back pressure at the EGR inlet port 42 and thereby increase the EGR flow. At higher engine speeds, for example, the controller 50 causes the throttle valve 54 to open, thereby decreasing the amount of flow restriction. The controller 50 is designed to control the throttle valve 54 in a desirable manner which may depend, for example, upon the particular configuration of the engine 10, the desired amount of nitric oxide emissions, the desired performance and output requirements of the engine 10, etc. In an embodiment, the throttle valve 54 is modulated, the position typically being updated at a relatively low frequency corresponding to transitions between engine speed and load on the order of every couple of seconds.

In addition to increasing EGR flow, the throttle valve 54 is useful for decreasing the warm up time for the engine 10 during initial engine starting. For example, during engine startup, the throttle valve 54 may be fully or substantially closed by the controller 50 to provide upstream back pressure in the exhaust duct 22. As a result, the engine 10 requires more fuel burn in order to achieve idle conditions. The higher fuel rate gives higher heat rejection to the engine coolant and, in turn, causes the engine 10 to warm up faster. Moreover, since EGR flow is usually avoided by closing the EGR valve 48 until the engine is warm, this reduces the time spent in a non-EGR/high nitric oxide ($NO_x$) emissions mode. By thus achieving a condition of EGR flow sooner, overall nitric oxide emissions are advantageously reduced.

The throttle valve 54 may also be additionally used for compression braking. According to this feature, the throttle valve 54 may be fully or substantially closed by the controller 50 to provide for high compression in the engine's cylinders 20. This may be used for compression braking to slow the speed of engine 10.

In the EGR system 12 illustrated in FIG. 1, the exhaust turbine 28 is a variable geometry turbine. The variable geometry turbine 28 includes variable geometry vanes which can be adjusted by an actuator 62 to control the swallowing capacity of the turbine 28. The variable geometry vanes also control the turbine efficiency. The actuator 62 may be controlled by the controller 50 via line 58. By combining the variable geometry turbine 28 with the throttle valve 54, the swallowing capacity (which can be controlled by either the variable geometry vanes or the throttle valve 54) can be controlled independently of the boost and rotor speed of the turbine 28 (which depends in part upon the position of the variable geometry vanes). It is an advantage that this provides for greater engine power, and improves specific fuel consumption and controllability. In the EGR system 12 of FIG. 1, the throttle valve 54 may also be partially closed by the controller 50 at higher engine speeds to increase back pressure and provide for increased EGR flow.

In the embodiments illustrated in FIGS. 2–5, the EGR system 14 includes an exhaust turbine 28' which can be a fixed geometry turbine. The exhaust duct 22 includes a wastegate duct 66 arranged in fluid parallel with the turbine 28' for bypassing excess pressure build-up in the exhaust duct 22 upstream of the turbine 28'. More specifically, the wastegate duct 66 is connected in fluid communication with the exhaust duct 22 at an inlet port located upstream of the turbine 28'. The wastegate duct 66 is connected to return flow to the exhaust duct at a reentry point downstream of the turbine 28'. The reentry point of wastegate duct 66 into exhaust duct 22 is located upstream of the throttle valve 54 in the embodiment of FIG. 2. However, as illustrated in FIG. 3, the reentry point of wastegate duct 66 into exhaust duct 22 can be located downstream of the throttle valve 54 in another embodiment of the invention.

Figure 4:
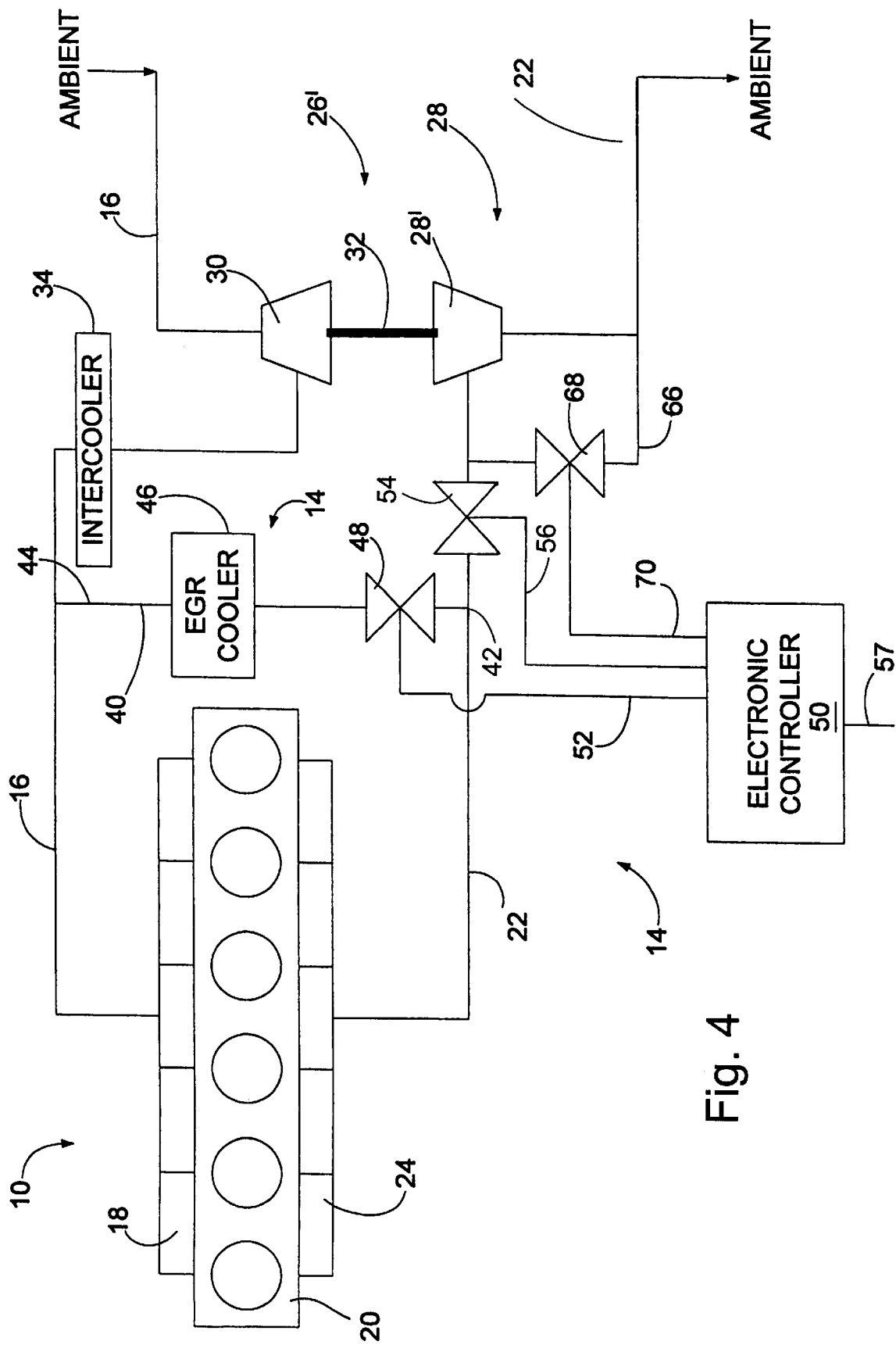
Figure 5:
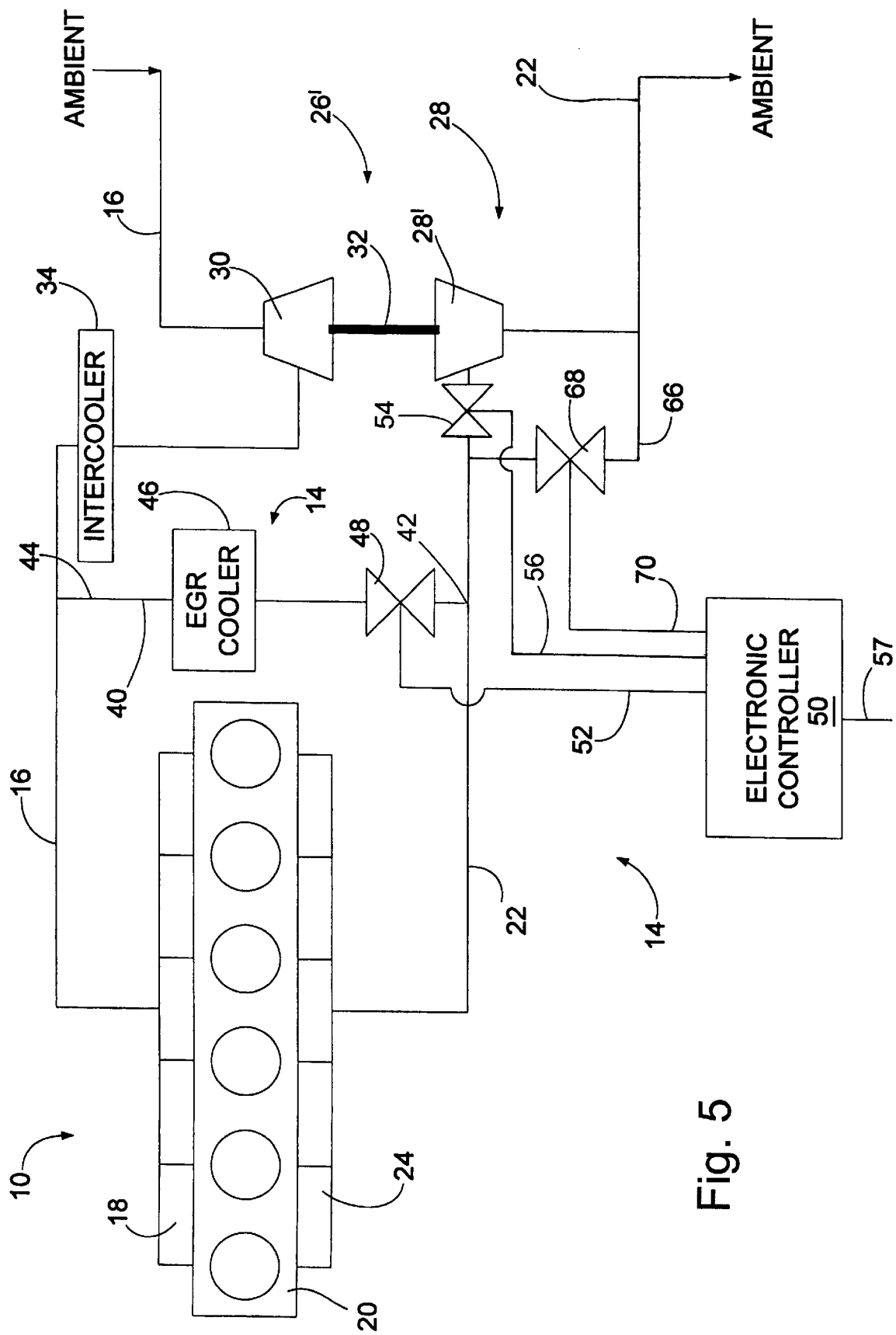

Alternatively, the throttle valve 54 can be located upstream of the turbine, as illustrated in FIGS. 4 and 5. In the system of FIG. 4, the throttle valve 54 is located upstream of the turbine 28' and also upstream of the inlet port 42 to the wastegate duct 66. In the system of FIG. 5, however, the throttle valve 54 is located upstream of the turbine 28' but downstream the inlet port 42 of the wastegate duct 66.

As also illustrated in FIGS. 2–5, a wastegate valve 68 is located in the wastegate duct 66. The wastegate valve 68 is operable to restrict or modulate flow through the wastegate duct 66 to control rotor speed and efficiency of the turbine 28'. In this manner, the condition of the wastegate valve 68 can be controlled in order to regulate performance of the engine 12. The wastegate duct 66 and the wastegate valve 68 are effective to vary the swallowing capacity of the turbine 28'. The wastegate valve 68 is controlled by the controller 50 via line 70.

The embodiment including the throttle valve 54 in combination with fixed geometry turbine 28' and wastegate duct 66 provides several advantages. One advantage is that EGR flow rate can be increased by providing a selective flow restriction by selectively closing the throttle valve 54 at part load and also at low speed/high load, thereby achieving the desired reduction rate in nitric oxide emissions to more easily comply with stringent emissions regulations. By increasing EGR flow rate, the injection timing may be advanced and fuel consumption improved. Because the throttle valve 54 may be used to build back pressure in the exhaust duct 22, the swallowing capacity of the exhaust turbine is not as critical for facilitating EGR flow, and therefore a larger turbine 64 can be selected if desired to provide a better matched turbocharger 26 and therefore a more efficient, better performing engine 12, particularly at higher engine speeds. Boost power may also be lowered with this embodiment to increase engine power. The throttle valve 54 may also be used for active compensation for variations in stack restrictions from one installation to another or changes in stack restriction over time. The throttle valve 54 may also be used for active compensation for variations between engines or for engine degradation over time.

In the systems wherein the throttle valve 54 is located downstream of the turbine 28', the wastegate bypass 66 may discharge the wastegated exhaust flow either upstream as shown in FIG. 2, or downstream of the throttle valve 54 as shown in FIG. 3. The throttle valve 54 may also be arranged to act on all exhaust flow to the exhaust stacks as illustrated, or alternatively any portion of the exhaust flow to the exhaust stacks regardless of whether the throttle valve 54 is located upstream or downstream of the exhaust turbine 28'.

All of the references cited herein, including patents, patent applications and publications are hereby incorporated in their entireties by reference. While this invention has been described in connection with exemplary embodiments, various changes and modifications will be apparent to those of ordinary skill in the art. Such changes and modifications may be made without departing from within the spirit and the scope of the invention. Accordingly, the appended claims are intended to cover such changes and modifications.

What is claimed is:

1. An internal combustion engine having an intake duct, an exhaust duct, and an exhaust gas recirculation system comprising:
    an EGR duct connected in fluid communication with the exhaust duct for guiding an EGR flow of exhaust gas from the exhaust duct to the intake duct;
    an EGR cooler located in the EGR duct for cooling the EGR flow prior to entering the intake duct;
    an exhaust turbine in the exhaust duct downstream of said EGR duct, the turbine driving an intake compressor;
    a throttle valve arranged in the exhaust duct downstream of said EGR duct operable to selectably restrict flow through the exhaust duct; and
    a controller operable to adjust the throttle valve;
    a wastegate duct in communication with the exhaust duct for bypassing a wastegate flow from the exhaust duct upstream of the exhaust turbine to reenter the exhaust duct downstream of the turbine; and
    a wastegate valve located in the wastegate bypass duct for selectively restricting said wastegate flow.

2. The engine according to claim 1, wherein the throttle valve is located downstream of the exhaust turbine.

3. The engine according to claim 2, wherein the throttle valve is located downstream of a port from in which the wastegate flow exits the wastegate duct into the exhaust.

4. The engine according to claim 2, wherein the throttle valve is located upstream of a port from in which the wastegate flow exits wastegate duct.

5. The engine according to claim 1, wherein the throttle valve is located upstream of the exhaust turbine.

6. The engine according to claim 5, wherein the throttle valve is located upstream of an inlet port into which the wastegate flow enters the wastegate duct.

7. The engine according to claim 5, wherein the throttle valve is located downstream of an inlet port into which the wastegate flow enters the wastegate duct.

8. The engine according to claim 1, wherein the controller adjusts the throttle valve to vary back pressure in the exhaust duct to control a rate of said EGR flow.

9. The engine according to claim 8, wherein the controller modulates the throttle valve as a function of engine speed.

10. The engine according to claim 8, wherein the controller substantially closes the throttle valve during a starting operation of the engine.

11. The engine according to claim 6, wherein the turbine is of a type having fixed geometry vanes.

12. The engine according to claim 1, wherein the controller is operable to substantially close the throttle valve to cause back pressure in the exhaust duct for providing compression braking.

13. The engine according to claim 1, further comprising an EGR valve located in the EGR duct adjustable to vary the EGR flow.

14. The engine according to claim 1, further comprising an intercooler located in the intake duct located upstream of the EGR duct.

15. An exhaust gas recirculation system for an internal combustion engine having an intake duct, an exhaust duct, and a turbocharger with a turbine located in the exhaust duct, the turbocharger driving a compressor located in the intake for charging air in the intake duct, the exhaust gas recirculation system comprising:
    an EGR duct connected in fluid communication with the exhaust duct upstream of the turbine for guiding an EGR flow of exhaust gas from the exhaust duct to the intake duct;
    an EGR cooler located in the EGR duct for cooling the EGR flow prior to entering the intake duct;
    a throttle valve arranged in the exhaust duct downstream of said EGR duct operable to selectably restrict flow through the exhaust duct;
    a controller operable to adjust the throttle valve for controlling back pressure in the exhaust duct;
    a wastegate duct in communication with the exhaust duct for bypassing a wastegate flow from the exhaust duct upstream of the exhaust turbine to reenter the exhaust duct downstream of the turbine; and
    a wastegate valve located in the wastegate bypass duct for selectively restricting said wastegate flow.

16. The exhaust gas recirculation system according to claim 15, wherein the throttle valve is located downstream of the exhaust turbine.

17. The exhaust gas recirculation system according to claim 16, wherein the throttle valve is located downstream of a port from in which the wastegate flow exits the wastegate duct into the exhaust.

18. The exhaust gas recirculation system according to claim 16, wherein the throttle valve is located upstream of a port from in which the wastegate flow exits wastegate duct.

19. The exhaust gas recirculation system according to claim 15, wherein the throttle valve is located upstream of the exhaust turbine.

20. The exhaust gas recirculation system according to claim 19, wherein the throttle valve is located upstream of an inlet port into which the wastegate flow enters the wastegate duct.

21. The exhaust gas recirculation system according to claim 19, wherein the throttle valve is located downstream of an inlet port into which the wastegate flow enters the wastegate duct.

22. The exhaust gas recirculation system according to claim 15, wherein the controller adjusts the throttle valve to increase back pressure in the exhaust duct for controlling a rate of said EGR flow.

23. The exhaust gas recirculation system according to claim 22, wherein the controller modulates the throttle valve as a function of one or more engine operating parameters.

24. The exhaust gas recirculation system according to claim 23, wherein one of said engine operating parameters is engine speed.

25. The exhaust gas recirculation system according to claim 23, wherein one of said engine operating parameters is engine load.

26. The exhaust gas recirculation system according to claim 22, wherein the controller is operable to substantially close the throttle valve during a starting operation of the engine.

27. The exhaust gas recirculation system according to claim 15, wherein the turbine is of a fixed geometry turbine.

28. The exhaust gas recirculation system according to claim 15, wherein said controller is operable to adjust the wastegate valve.

29. The exhaust gas recirculation system according to claim 15, wherein the controller is operable to substantially close the throttle valve to cause back pressure in the exhaust duct for providing compression braking.

30. The exhaust gas recirculation system according to claim 15, further comprising an EGR valve located in the EGR duct adjustable to vary the EGR flow.

* * * * *